March 5, 1946.  T. M. FERRILL, JR  2,395,854

FLIGHT PATH CONTROLLER

Filed Nov. 8, 1943

INVENTOR
THOMAS M. FERRILL, JR.
BY
Herbert A. Thompson
his ATTORNEY.

Patented Mar. 5, 1946

2,395,854

UNITED STATES PATENT OFFICE 2,395,854

FLIGHT PATH CONTROLLER

Thomas M. Ferrill, Jr., Hempstead, N. Y., assignor to Sperry Gyroscope Company, Inc., a corporation of New York Application November 8, 1943, Serial No. 509,442

13 Claims. (Cl. 250—11)

This invention relates to navigation systems and more specifically to piloting a craft relatively to an electromagnetically defined reference zone or line.

The invention has special application in defining an arbitrary course or path, portions of which are displaced from a reference zone defined by one or more directive electromagnetic radiation patterns. Although the invention is applicable to radio beacon systems and to instrument landing systems generally, whether of the equi-signal or constant intensity type, the principles of the invention herein are shown as applied to a modified instrument landing system in order to simplify the illustration. More specifically the invention is herein disclosed as applied to a system for guiding an aircraft along a modified glide path, using the equi-signal zone of a pair of overlapping beams of electromagnetic radiations as a reference. It will be apparent, however, that other well-known reference zones might be employed, and that the system is applicable to other types of dirigible craft.

The principal objects of the present invention are: to provide an improved navigation system for guiding a craft relative to a reference zone in space; to provide a simple method and apparatus for guiding a craft along an arbitrarily chosen path spaced from a defined path, while using the defined path as a reference; to provide an aircraft guiding system of the type equipped with a left-right indicator such that the craft might travel along a prescribed route separated from an electromagnetically defined reference line while maintaining the indicator in the zero position; and to provide a system whereby a pilot might travel by instruments, a course preferred by him to that normally defined by a radio beacon.

These and other objects will become more apparent from the following description and from the accompanying drawing showing a representative form of the invention.

Generally speaking the invention comprehends charting a course having portions displaced from a reference line or zone and generating a signal equal and opposite to the crossed pointer meter displacement signal at such portions, whereby the displacement signals are neutralized while the craft follows the charted course. The signals required to neutralize the displacement signals may be stored or recorded and may be formed to oppose the respective displacement signals as the craft reaches the corresponding portions of the course.

Figure 1:
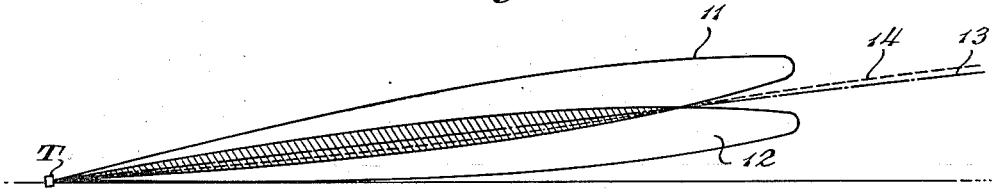
Fig. 1 is a diagram illustrating a pair of overlapping lobes of electromagnetic radiation defining a straight equi-signal glide path.

Fig. 1 discloses a pair of overlapping lobes 11 and 12, comprising electromagnetic directivity patterns emanating from a suitable transmitter T. The lobes are arranged relative to one another and to the surface of the earth so that the equi-signal zone 13 defines a straight glide path or reference line in the vertical plane extending at the desired angle to the earth's surface. Obviously one of the lobes might be used alone to define a curved constant-intensity line of flight, serving as a reference line for the present apparatus. The respective lobes 11 and 12 are distinctively modulated, e. g. at 900 and 600 cycles per second, respectively, in accordance with standard practice. According to the present invention, it may be desirable to provide a modified glide path 14, for example of the shape illustrated by the broken line 14 in Fig. 1. Although the path 14 is disclosed as a shallow serpentine curve having a portion steeper than the glide path 13, and a portion near the transmitter T sloping less than the glide path 13, it is apparent that the invention is not restricted to any particular shape of modified course. Nor is it necessary that the displacement between the reference path and the arbitrarily chosen course occur in the vertical plane, since with overlapping lobes defining a path in azimuth, the new course may be charted along varying compass directions and displaced horizontally from the reference course, for example, to avoid obstacles located along the equi-signal or other reference zone.

Figure 2:
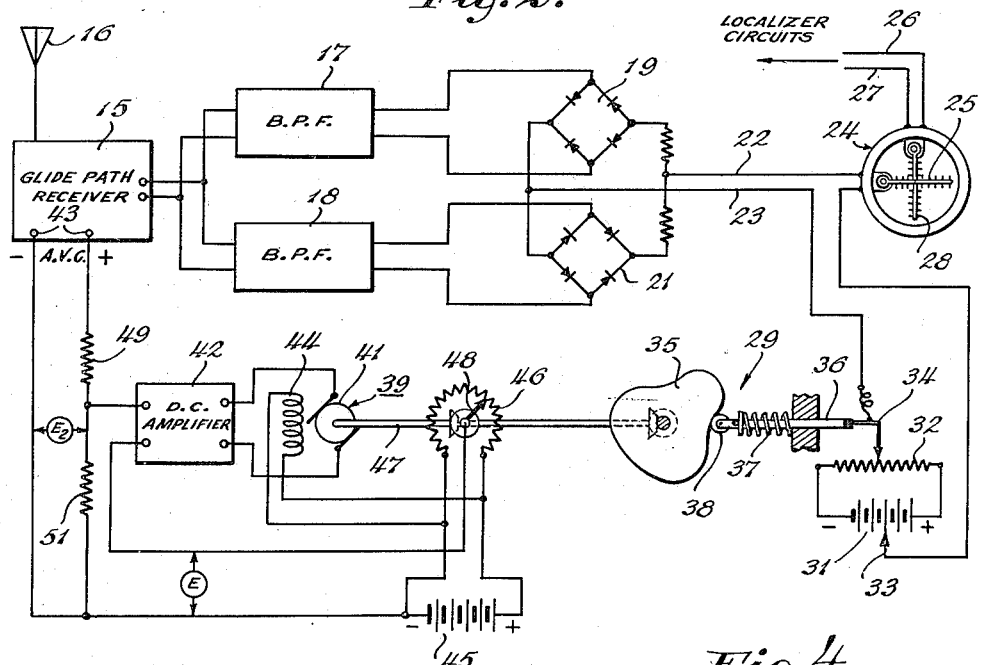
Fig. 2 is a diagram of a glide path receiver, showing the portions thereof adapted to provide a modified course.

Fig. 2 discloses an apparatus that permits a pilot to guide his craft along the charted course 14 while maintaining a conventional flight indicator in the zero or neutral position. Such an apparatus may comprise a conventional receiver 15 receiving electromagnetic energy from an antenna 16. The receiver includes the usual pre-amplifiers, local oscillator, mixer, detector, and audio-amplifier circuits, the output of which feeds into band-pass filters 17 and 18, adapted to pass the detected high and low modulation frequency components respectively, of the received energy. The filters 17 and 18 feed into bridge connected rectifiers 19 and 21, the output of which provides a direct current signal between wires 22 and 23 having a magnitude proportional to the difference of strengths of the high and low modulation frequency components, and a sense dependent on which component is the stronger. Ordinarily, the direct current signal across wires 22 and 23 is applied to a flight indicator 24, such as a left-right type meter having a pointer 25, or the control circuits of an automatic pilot.

With the device shown in Fig. 2 deviations of the aircraft from the equi-signal glide path 13 would cause deflection of pointer 25 if the wires 22 and 23 were connected in the normal fashion directly to the meter 24, in response to a displacement signal appearing across wires 22 and 23. With such a normal arrangement the pointer remains in the zero or neutral position whenever the output signals from the respective rectifiers 19 and 21 are equal. If the craft is displaced to a point above or below the glide path either the 900 cycle or 600 cycle component predominates, and across wires 22 and 23 appears a direct current signal voltage having a magnitude as a function of the amount of craft displacement, and a sense dependent upon the direction of craft displacement, from the equi-signal zone represented by line 13, whereby pointer 25 denotes the relation of the aircraft to the glide path zone 13. Similar control circuits may be utilized to provide a signal across wires 26 and 27, whereby a second pointer 28 is displaced in accordance with the craft displacement in azimuth, the intersection of the crossed pointers providing a continuous indication of the craft position. To simplify the disclosure, control of displacement in only one plane has been shown, though similar apparatus may be used for control in the other plane.

By slightly modifying the receiver, any desired course within the limits of the equipment may be followed, and the respective pointer or pointers of the indicator maintained in the neutral position even though the craft is displaced from the equi-signal reference zone indicated by line 13. A simple arrangement for producing this result, disclosed in Fig. 2, comprises means for generating a neutralizing signal to counterbalance the displacement signal during movement of the craft along course 14, the instantaneous magnitude of which neutralizing signal is determined by the desired instantaneous displacements of the craft from the reference zone 13. If it is assumed that the displacement signal appearing across wires 22 and 23 is directly proportional to the lateral displacement of the craft from the reference line 13 as seen in Fig. 1, it becomes necessary only to provide neutralizing signals having an intensity proportional to the desired instantaneous displacements of the successive portions of the course from the reference line, but opposite in sense to the displacement signal that would occur at such portions, whereby the craft may be flown along an arbitrary route 14 by maintaining the indicator 24 with its pointers in the "on-course" position illustrated in Fig. 2.

The required neutralizing signals may be determined by manually recording the successive values of the respective displacements, as by reading the meter 24 as the craft follows an arbitrarily chosen course, and resolving such readings into their equivalent values of meter voltage or current. Thus, if a pilot would prefer to fly the course 14 by instruments, instead of the ordinary equi-signal glide path 13, he may first manually guide the craft along the modified course 14 during ideal flying conditions, while a record is made of the magnitude and sense of the displacements indicated by pointer 25, which reading are correlated with determinations of the instantaneous position of the craft along the course, such as might be derived as a function of air-speed, time, absolute altitude, or by measuring the distance intervening between the craft and the destination such as transmitter T. One simple arrangement measures the distance as a function of the field strength within the lobes 11 and 12, determined by the automatic volume control voltage available in most modern receivers.

In order to instrument-fly the course 14, it is merely necessary for the required neutralizing voltages to be applied to the meter 24, such that the instantaneous magnitude thereof for each position of the craft corresponds with the signals required to form the recorded pointer displacements. Although the neutralizing signals might be applied in opposition to the displacement signals manually, it is preferred to provide automatic neutralization by storing the neutralizing signals on a suitable record or storage device and to reform the signals at the required moments. Such an arrangement is disclosed in Fig. 2, wherein the signal across wires 22 and 23 may be neutralized by a potential or signal derived from a suitable source or generator 29, a simple arrangement of which comprises a direct current battery 31, the output voltage of which is applied to a potentiometer 32. The varying neutralizing signal is obtained between a tap 33 and a slider 34 movable across the potentiometer winding according to a predetermined arrangement. The respective values of the neutralizing signal may be derived by forming a cam 35, record, or similar storage device, whereby the individual signals may be repeated when needed. Although the cam or other storing device may be shaped according to the directly-taken readings of the meter 24, observed during a flight along the desired route, it is obvious that any arbitrarily chosen course may be plotted graphically and the displacement readings and corresponding signals computed for the respective positions of the craft along the course. In either case the shape of the cam determines the instantaneous position of the slider 34, and accordingly the sense and magnitude of the neutralizing signal, for example, by means of a cam follower 36 having a spring 37 urging roller 38 against the cam dwell.

In order to permit the desired course to be followed while the crossed-pointer meter is maintained in the neutral position, the cam must be made to rotate at a speed coordinated with the ground speed of the craft, so that each portion of the cam corresponds to a predetermined distance of the craft from the transmitter T. As previously pointed out the movements may be coordinated in any convenient manner, typical of which is the automatic volume control (AVC) arrangement shown in Fig. 2. A suitable servo device 39 may comprise a direct current motor having an armature 41 energized from a direct current amplifier 42 whenever a suitable AVC signal appears across terminals 43. The field winding 44 may be energized from a battery or other source 45, the terminals of which also connect with the terminals of a potentiometer winding 46, forming one portion of a repeat-back arrangement. Armature shaft 47 rotates a slider 48 in synchronism with the rotary movement of the cam 35. Two resistors 49 and 51 are connected in the AVC output, as shown in Fig. 2, whereby a portion $E_2$ of the AVC output voltage appears across resistor 51 providing an input signal for the amplifier 42. The amplitude of the input voltage varies as the field strength of the received energy so that for every position of the craft along the course there is a corresponding voltage $E_2$ across resistor 51. The motor 39 rotates to erase the amplifier input signal, e. g., by rotating the slider 48 through part of a revolution until the voltage E across the tapped turns equals the voltage $E_2$, at which time no signal remains and the motor stops. It will be apparent that for each value of input voltage and hence for each position of the craft there is a corresponding position for the cam 35, and a resulting predetermined value for the neutralizing signal, as evidenced by the position of the slider 34. As the craft proceeds on its course, cam 35 rotates progressively, thereby providing neutralizing signals that are equal in amplitude, but opposite in sense to the displacement signals for all positions of the craft, assuming that the signals are combined at the indicator. It is apparent that if the signals are combined thermionically, the displacement signals might be erased by smaller or larger neutralizing signals.

Figure 4:
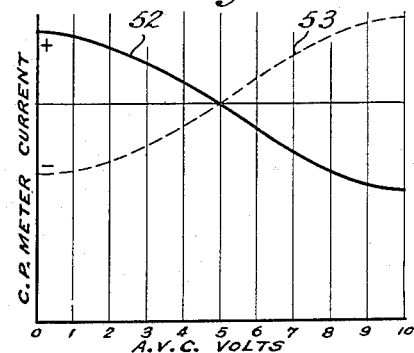
Fig. 4 is a graph illustrating the relation between the crossed-pointer meter current and the automatic volume control voltage for a typical operating condition, utilizing apparatus of the type shown in Fig. 2.

Fig. 4 illustrates a typical operating condition wherein the line 52 represents the crossed-pointer meter current as determined for an arbitrarily chosen course, and curve 53 represents the values of the neutralizing meter-current signals developed by the cam 35 in opposition thereto.

Figure 3:
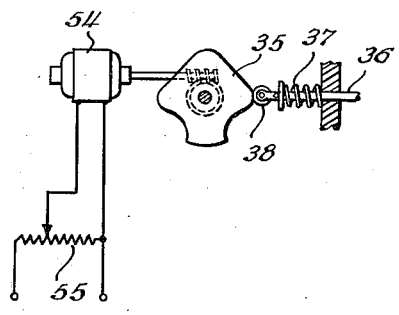
Fig. 3 is a detail view of a portion of the signal generator that might be used in place of the corresponding device shown in Fig. 2.

Fig. 3 illustrates a slight variation of the AVC cam control, shown in Fig. 2. Instead of utilizing the AVC voltage as a control parameter, the cam 35 may be controlled as a function of time by a motor 54, preferably operating within a narrow range of speed variation. Although the motor 54 may be a synchronous motor of the type employed in clocks, it may otherwise be a variable speed motor controlled by a resistor 55 to compensate for changes in ground speed. Motor 54 thus locates the cam 35 as a function of time when the flight conditions may be accurately determined, e. g. when the air speed and time are accurately known. Motor 54 is set in operation at the starting point or at a known point along the course, as at a point defined by a marker beacon, or known landmark.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A method of navigating a craft, comprising charting a desired course, determining at successive points along said course the departure of said course from the equi-signal zone of a pair of overlapping lobes of electromagnetic radiation, forming a signal indicative of said craft departure and opposing said signal at said points with a second signal proportional to said departure determined for said points.

2. A method of guiding a craft on any selected course extending generally along but having portions separated from the equi-signal zone of a pair of overlapping radio beams, comprising providing an indication of the instantaneous departure of said craft from said zone, deriving signals proportional to the departure of said course from said zone at said respective portions of said course, and neutralizing said indication with corresponding signals as said craft approaches said respective portions.

3. A method of guiding a craft along a course having portions displaced from a zone defined by a radio beam, comprising determining the departure of the respective portions of said course from said zone for the various instantaneous positions of said craft along said course, providing an indication of the sense and magnitude of the departure of said craft from said zone, providing neutralizing signals proportional to the instantaneous departure of said course from said zone, and neutralizing said indication with said signals so as to counterbalance an indication of departure from said zone while said craft follows said course.

4. A method of guiding a craft along a desired course at least portions of which are displaced within predetermined limits from a zone defined by a characteristic of a radio beam, said method comprising indicating normal transverse departure of said craft from said zone, determining the magnitude and sense of the indication at said successive portions when said craft follows said course, generating impulses equal in magnitude but opposite in sense to said indication, and applying said respective impulses to said indications when said craft is located at the corresponding portions of said course, whereby said indication remains at zero while said craft follows said course.

5. In an apparatus for guiding a craft along a course having portions displaced from a zone defined by an electromagnetic radiation pattern, the combination comprising position-denoting means for deriving a signal responsive to displacement of said craft from said zone, course-defining means for deriving a signal representative of displacement of said course from said zone, and means for combining said signals.

6. Apparatus for guiding a craft along a course having portions displaced from a zone defined by an electromagnetic radiation pattern, comprising means for generating indicator signals denoting magnitude and sense of displacement of said craft from said zone, an indicator responsive to said signals, means for generating neutralizing signals as a function of the displacement of the successive portions of said course from said zone equal in magnitude but opposite in sense to the indicator signals formed when said craft is located at said portions, and means for combining said neutralizing signals with indicator signals.

7. An instrument-landing receiver for aircraft, comprising a radio receiver having an indicator responsive to displacement signals produced by displacement of said aircraft from a path defined by a radio beam, means for generating neutralizing signals equal in magnitude but opposite in sense to the displacement signals that are formed during progress of said aircraft along a charted course having portions displaced from said path, and means for combining corresponding displacement and neutralizing signals, whereby said indicator remains neutral while said aircraft follows said course.

8. An instrument-landing receiver for aircraft, comprising a radio receiver having means for forming indicator signals as a function of the displacement of said aircraft from an electromagnetically-defined instrument-landing path, a right-left type indicator responsive to said indicator signals, and means for anticipating the magnitude and sense of said signals along an arbitrarily charted course having portions displaced from said path and for applying to said receiver successive correction signals neutralizing the effect of said indicator signals for all points along said portions of said charted course.

9. In an aircraft instrument-landing receiver of the type incorporating an indicator responsive to the sense and magnitude of displacement of said aircraft from an electromagnetically defined instrument-landing path, the combination comprising means for producing neutralizing signals corresponding to predetermined displacements of said aircraft from said path as said aircraft follows an arbitrary course having portions displaced from said path, and means for applying said neutralizing signals to said receiver so as to restore said indicator to a neutral position while said craft follows said arbitrary course.

10. The combination as claimed in claim 9 including means responsive to the intensity of the received electromagnetic energy for correlating the respective neutralizing signals with the successive positions of said aircraft.

11. The combination as claimed in claim 9, wherein said signal-producing means comprises a variable impedance, and means for varying said impedance according to a predetermined function of time.

12. In an aircraft instrument-landing receiver of the type incorporating an indicator responsive to the sense and magnitude of displacement of said aircraft from an electromagnetically defined instrument-landing path, the combination comprising means for producing neutralizing signals corresponding to predetermined displacements of said aircraft from said path as said aircraft follows an arbitrary course having portions displaced from said path, said producing means including a storage device for said neutralizing signals, and means for forming the respective stored signals when the aircraft arrives adjacent to the corresponding portion of said course, and means for applying said respective neutralizing signals to said receiver so as to maintain said indicator in a neutral position while said craft follows said arbitrary course.

13. An aircraft instrument-landing receiver, comprising means for producing signals responsive to the vertical displacement of said aircraft from a glide path defined by overlapping lobes of electromagnetic energy, a meter having a pointer operative by said displacement signals to denote the magnitude and sense of said displacement, means for defining an arbitrary course having portions thereof displaced from said glide path, said defining means comprising a signal generator coordinated with the successive positions of said aircraft for producing neutralizing signals capable of counterbalancing the displacement signals corresponding to each of said positions, and means for combining said displacement and said neutralizing signals to maintain said pointer at a neutral position while said aircraft follows said arbitrary course.

THOMAS M. FERRILL, Jr.